US012610372B2

(12) United States Patent
Zhang et al.

(10) Patent No.: US 12,610,372 B2
(45) Date of Patent: Apr. 21, 2026

(54) DOWNLINK DATA RECEPTION OPERATION

(71) Applicant: Apple Inc., Cupertino, CA (US)

(72) Inventors: Yushu Zhang, Beijing (CN);
Chunxuan Ye, San Diego, CA (US);
Dawei Zhang, Saratoga, CA (US);
Haitong Sun, Cupertino, CA (US);
Hong He, San Jose, CA (US);
Oghenekome Oteri, San Diego, CA
(US); Seyed Ali Akbar Fakoorian, San
Diego, CA (US); Wei Zeng, Saratoga,
CA (US); Weidong Yang, San Diego,
CA (US)

(73) Assignee: Apple Inc., Cupertino, CA (US)

( * ) Notice: Subject to any disclaimer, the term of this
patent is extended or adjusted under 35
U.S.C. 154(b) by 370 days.

(21) Appl. No.: 17/754,458

(22) PCT Filed: Apr. 6, 2021

(86) PCT No.: PCT/CN2021/085646
§ 371 (c)(1),
(2) Date: Apr. 1, 2022

(87) PCT Pub. No.: WO2022/213259
PCT Pub. Date: Oct. 13, 2022

(65) Prior Publication Data
US 2024/0073918 A1    Feb. 29, 2024

(51) Int. Cl.
*H04W 72/232*    (2023.01)
*H04W 72/02*    (2009.01)
*H04W 72/1273*    (2023.01)

(52) U.S. Cl.
CPC ......... *H04W 72/232* (2023.01); *H04W 72/02*
(2013.01); *H04W 72/1273* (2013.01)

(58) Field of Classification Search
CPC ............... H04W 72/232; H04W 72/02; H04W
72/1273; H04W 72/23; H04L 1/08;
(Continued)

(56) References Cited

U.S. PATENT DOCUMENTS

2015/0296513 A1* 10/2015 Nogami ................ H04L 5/0053
370/329
2019/0281587 A1    9/2019 Zhang et al.
(Continued)

FOREIGN PATENT DOCUMENTS

WO    2020/146848    7/2020

OTHER PUBLICATIONS

Huawei et al., "Enhancements on multi-TRP for reliability and
robustness in Rel-17", 3GPP TSG RAN WG1 Meeting #103-3,
R1-2007587, Nov. 13, 2020, 12 sheets.
(Continued)

*Primary Examiner* — Charles N Appiah
*Assistant Examiner* — Frank E Donado
(74) *Attorney, Agent, or Firm* — Fay Kaplun & Marcin,
LLP

(57) ABSTRACT

Embodiments of the present disclosure relate to downlink
data reception operation. According to embodiments of the
present disclosure, a baseband processor of a user equipment
(UE) is configured to perform operations comprising receiv-
ing Downlink Control Information (DCI) through more than
one beams TRP, determining a DCI transmission scheme for
the received DCI, wherein the DCI transmission scheme is
configured by an upper layer signaling, and wherein the DCI
transmission scheme is one of a Single Frequency Network
(SFN) scheme, a non-SFN scheme, and a hybrid scheme,
wherein the DCI is transmitted using both SFN scheme and
non-SFH scheme in the hybrid scheme, determining whether
the received DCI indicates a Transmission Configuration
(Continued)

200 ⟍

RECEIVE DCI THROUGH MORE THAN ONE BEAMS FROM AT
LEAST ONE TRP ⎯ 210

DETERMINE DCI TRANSMISSION SCHEME FOR RECEIVED DCI ⎯ 220

RECEIVED DCI INDICATES TCI
FOR PDSCH RECEPTION? ⎯ 230

N

SELECT AT LEAST ONE TCI FOR PDSCH RECEPTION
FROM CANDIDATE TCIS CONFIGURED FOR ONE OR MORE
CORESETS ASSOCIATED WITH DCI BASED ON DCI
TRANSMISSION SCHEME ⎯ 240

Indicator (TCI) for PDSCH reception from the at least one TRP or not.

20 Claims, 7 Drawing Sheets

(58) Field of Classification Search
CPC ... H04L 5/0044; H04L 5/0028; H04L 5/0032; H04L 5/0053; H04L 5/0092; H04L 5/0023; H04B 7/088; H04B 7/024
See application file for complete search history.

(56) References Cited

U.S. PATENT DOCUMENTS

| | | | | |
|---|---|---|---|---|
| 2019/0342907 | A1* | 11/2019 | Huang | H04L 5/0053 |
| 2020/0053580 | A1 | 2/2020 | Bagheri et al. | |
| 2021/0410145 | A1* | 12/2021 | Khoshnevisan | H04W 72/1263 |
| 2022/0132543 | A1* | 4/2022 | Bai | H04W 72/044 |
| 2022/0338222 | A1* | 10/2022 | Kim | H04W 72/1273 |
| 2023/0047603 | A1* | 2/2023 | Kim | H04L 1/08 |
| 2023/0096196 | A1* | 3/2023 | Kim | H04L 5/0005 370/329 |
| 2023/0397204 | A1* | 12/2023 | Yuan | H04L 1/08 |
| 2024/0129772 | A1* | 4/2024 | Laddu | H04B 7/022 |
| 2024/0381413 | A1* | 11/2024 | Fan | H04L 5/0053 |

OTHER PUBLICATIONS

Futurewei, "Enhancement to support HST-SFN deployment scenario", 3GPP TSG RAN WG1 #103-e, R1-2007543, Nov. 13, 2020, 7 sheets.

OPPO, "Enhancements on multi-TRP for PDCCH, PUCCH and PUSCH", 3GPP TSG RAN WG1 #104-e, Jan. 19, 2021, R1-2100119, 16 sheets.

Convida Wireless, "Multi-TRP Enhancements for PDCCH, PUCCH and PUSCH", 3GPP TSG-RAN WG1#104-e, Jan. 19, 2021, R1-2101415, 10 sheets.

* cited by examiner

200

210

RECEIVE DCI THROUGH MORE THAN ONE BEAMS FROM AT LEAST ONE TRP

220

DETERMINE DCI TRANSMISSION SCHEME FOR RECEIVED DCI

230

RECEIVED DCI INDICATES TCI FOR PDSCH RECEPTION?

N

240

SELECT AT LEAST ONE TCI FOR PDSCH RECEPTION FROM CANDIDATE TCIS CONFIGURED FOR ONE OR MORE CORESETS ASSOCIATED WITH DCI BASED ON DCI TRANSMISSION SCHEME

300

310

DETERMINE THAT DCI TRANSMISSION SCHEME IS SFN SCHEME

320

SELECT AT LEAST ONE TCI
FROM CANDIDATE TCIS CONFIGURED FOR ONE CORESETS

700

710

DETERMINE THAT DCI TRANSMISSION SCHEME IS HYBRID SCHEME

720

SELECT AT LEAST ONE TCI
FROM CANDIDATE TCIS CONFIGURED FOR PLURALITY OF CORESETS

900

910

RECEIVE DCI THROUGH MORE THAN ONE BEAMS FROM AT LEAST ONE TRP

920

DETERMINE DCI TRANSMISSION SCHEME FOR RECEIVED DCI

930

RECEIVED DCI INDICATES TCI FOR PDSCH RECEPTION?

N

940

OBTAINING AT LEAST ONE TCI FOR PDSCH RECEPTION VIA HIGHER LAYER SIGNALING

1000

1040

1010

TRANSCEIVER

PROCESSOR

1020

MEMORY

1022

RAM

1024

ROM

1030

DOWNLINK DATA RECEPTION OPERATION

TECHNICAL FIELD

Embodiments of the present disclosure generally relate to the field of telecommunications, and in particular, to downlink data reception operation.

BACKGROUND

In Release 17, Physical Downlink Control Channel (PDCCH) enhancements are introduced for multiple Transceiver Points (TRPs) use case. Two scenarios for the PDCCH reception, namely a Single Frequency Network (SFN) scheme and a non-SFN scheme, are introduced for the enhancements.

SUMMARY

In general, example embodiments of the present disclosure provide a solution for downlink data reception operation.

In a first aspect, there is provided a baseband processor of a user equipment. The baseband processor of the user equipment is configured to perform operations comprising: receiving Downlink Control Information (DCI) through more than one beams from at least one TRP; determining a DCI transmission scheme for the received DCI, wherein the DCI transmission scheme is configured by an upper layer signaling, and wherein the DCI transmission scheme is one of a Single Frequency Network (SFN) scheme, a non-SFN scheme, and a hybrid scheme, wherein the DCI is transmitted using both SFN scheme and non-SFH scheme in the hybrid scheme; determining whether the received DCI indicates a Transmission Configuration Indicator (TCI) for PDSCH reception from the at least one TRP or not; and in accordance with a determination that the received DCI fails to indicate the TCI and based on the determined DCI transmission scheme, selecting at least one TCI for the PDSCH reception from candidate TCIs configured for one or more Control Resource Sets (CORESETs) associated with the DCI.

In a second aspect, there is provided a baseband processor of a user equipment. The baseband processor of the user equipment is configured to perform operations comprising: receiving DCI through more than one beams from at least one TRP; determining a DCI transmission scheme for the received DCI, wherein the DCI transmission scheme is configured by an upper layer signaling, and wherein the DCI transmission scheme is one of a Single Frequency Network (SFN) scheme, a non-SFN scheme, and a hybrid scheme, wherein the DCI is transmitted using both SFN scheme and non-SFH scheme in the hybrid scheme; determining whether the received DCI indicates a TCI for PDSCH reception from the at least one TRP; and in accordance with a determination that the received DCI fails to indicate the TCI and based on the determined DCI transmission scheme, obtaining at least one TCI for the PDSCH reception via an upper layer signaling.

In a third aspect, there is provided a user equipment. The user equipment comprises the baseband processor of any of the first aspect or the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

The terminology used herein is for the purpose of describing particular embodiments only and is not intended to be limiting of example embodiments. For example, as used herein, the singular forms "a", "an" and "the" are intended to include the plural forms as well, unless the context clearly indicates otherwise. The terms "comprises", "comprising", "has", "having", "includes" and/or "including", when used herein, specify the presence of stated features, elements, and/or components etc., but do not preclude the presence or addition of one or more other features, elements, components and/or combinations thereof. Moreover, when a particular feature, structure, or characteristic is described in connection with some embodiments, it is submitted that it is within the knowledge of one skilled in the art to affect such feature, structure, or characteristic in connection with other embodiments whether or not explicitly described.

It is also to be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

Figure 1:
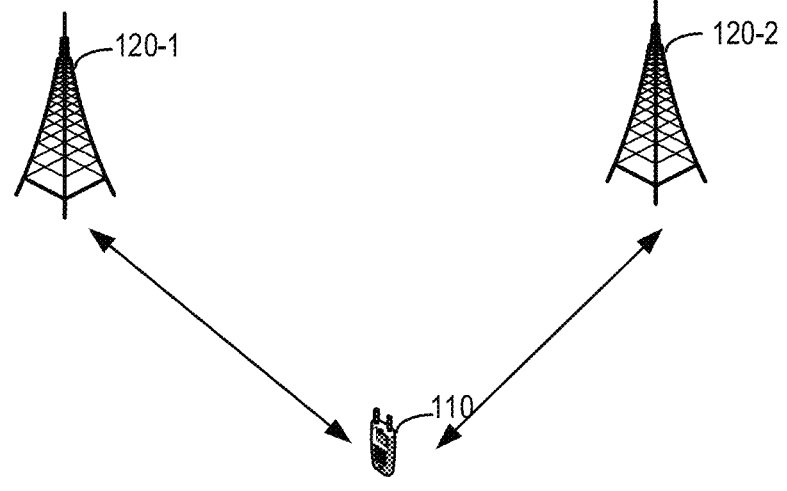
FIG. 1 shows an example communication network in which example embodiments of the present disclosure can be implemented.

FIG. 1 shows an example communication network 100 in which embodiments of the present disclosure can be implemented. The network 100 includes two base stations (BSs) 120-1 and 120-2, which may be collectively referred to as "BSs 120" or individually referred to as a "BS 120". Hereinafter the BS 120-1 and the BS 120-2 may also be referred to as the TRP 120-1 and the TRP 120-2, respectively. The network 100 also includes a UE 110 served by at least one of the TRP 120-1 and TRP 120-2.

It is to be understood that the numbers of the BSs 120 and the UE 110 as shown in FIG. 1 are only for the purpose of illustration without suggesting any limitations. The network 100 may include any suitable number of BSs and UEs adapted for implementing embodiments of the present disclosure.

In the communication network 100, the BS 120 can communicate data and control information to the UE 110 and the UE 110 can also communication data and control information to the BS 120. A link from the BS 120 to the UE 110 is referred to as a downlink (DL) or a forward link, while a link from the UE 110 to the BS 120 is referred to as an uplink (UL) or a reverse link.

In Release 15 and 16, the Quasi Co Location (QCL) assumption for Physical Downlink Shared Channel (PDSCH) is defined. If any TCI state includes a QCL-TypeD configuration (FR2) and if the scheduling offset is below a threshold reported by the UE, the UE receives the PDSCH based on default beam(s), i.e., TCI configured for CORESET(s) or activated by MAC CE.

Furthermore, if the TCI is present in scheduling DCI, the UE receives the PDSCH based on the QCL information indicated by the TCI, while if the TCI is not present in scheduling DCI, the UE receives the PDSCH based on the QCL information indicated by the CORESET for the scheduling PDCCH. Hereinafter the scenario "the TCI is not present in scheduling DC" may referred to a case when tci-PresentInDCI is not enabled.

In Release 17, PDCCH enhancements are introduced for multiple TRPs use case. Two scenarios for the PDCCH reception, namely a SFN scheme and a non-SFN scheme, are introduced. In the SFN scheme, the BS can transmit PDCCH repetitions with fully overlapped resources with different beams and the BS can configure 2 TCI states for a CORESET. In the non-SFN scheme, the BS can transmit PDCCH repetitions with non-overlapped resources with different beams. In this scheme, the PDCCH repetitions can be carried by 2 Search Spaces (SSs), which can be connected to 2 CORESETs.

For SFN-scheme and non-SFN scheme, how to define the QCL assumption for the PDSCH reception when the TCI is not present may need to be further discussed for different PDSCH transmission scheme, namely for single-TRP operation, SDM/FDM/TDM and SFN based on single-DCI mode based multi-TRP operation and multi-DCI mode based multi-TRP operation.

Some embodiments of the present disclosure provide a solution for downlink data reception operation. In this solution, when a UE determines that the TCI fails to be indicated in DCI, the UE may determine whether the DCI is allow to be transmitted from one or more TRPs in at least one of the SFN scheme or a non-SFN scheme. If the UE determines that the DCI is allow to be transmitted from one or more TRPs in at least one of the SFN scheme or a non-SFN scheme, the UE may select at least one TCI for PDSCH reception from candidate TCIs configured for one or more CORESETs with scheduling PDCCH. Hereinafter the scenario where the TCI fails to be indicated in DCI may be considered as the case when tci-PresentlnDCI is not enabled.

According to the embodiments of the present disclosure, the mechanism for PDSCH reception when the TCI is not present in the scheduling DCI can be achieved by applying the TCI state configured for CORESET(s) with scheduling PDCCH.

Principle and implementations of the present disclosure will be described in detail below with reference to FIGS. 2-9.

Figure 2:
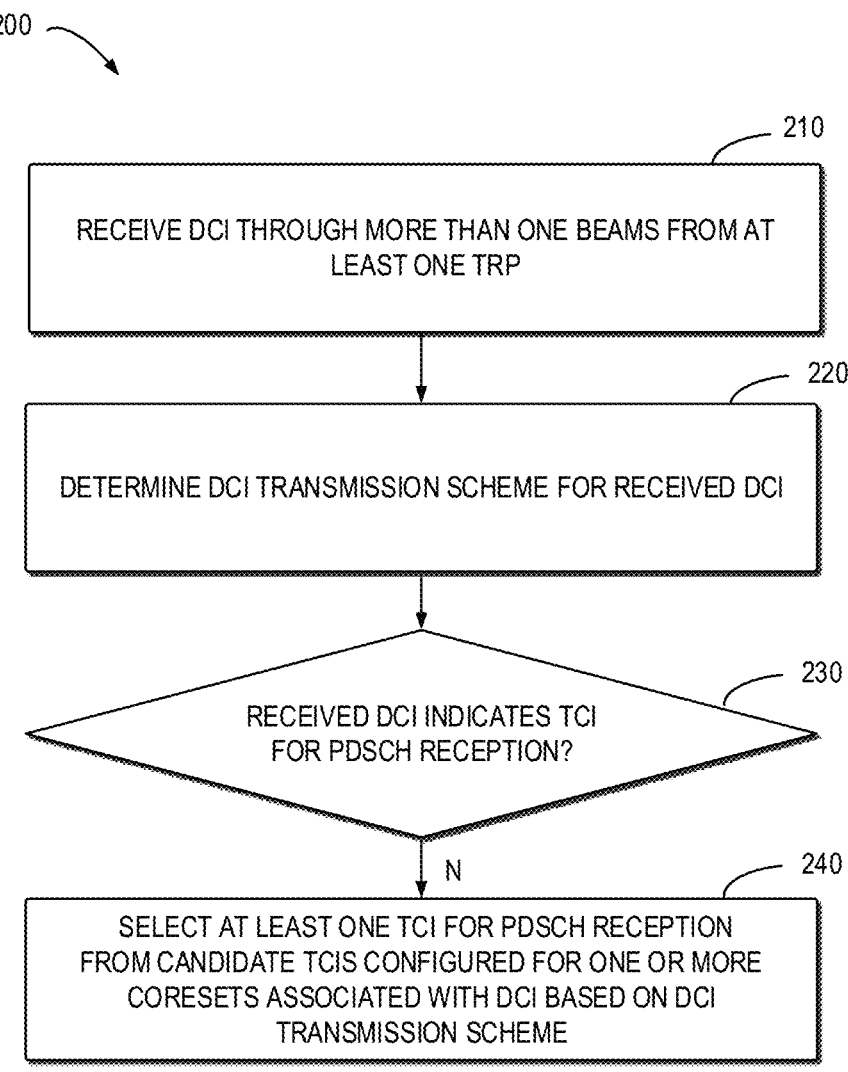
FIG. 2 illustrates a flowchart illustrating an example method of downlink data reception operation according to some embodiments of the present disclosure.

Reference is now made to FIG. 2. FIG. 2 illustrates a flowchart of an example method 200 for downlink data reception operation according to some embodiments of the present disclosure. For the purpose of discussion, the method 200 will be described with reference to FIG. 1. The method 200 may involve the UE 110 shown in FIG. 1.

At block 210, the UE 110 receives DCI through more than one beams from at least one TRP 120. The DCI can be carried on PDCCH(s) from the at least one TRP 120 to the UE 110. The UE 110 may determine the PDCCH on time and frequency domain based on the CORESET and/or SS.

At block 220, the UE 110 determines a DCI transmission scheme for the received DCI. As described above, the PDCCH repetitions can be transmitted by BS with fully overlapped resources with different beams in SFN scheme, while the PDCCH repetitions can be transmitted by BS with non-overlapped resources with different beams in non-SFN scheme. Furthermore, the received DCI can be transmitted from the at least one TRP 120 in a hybrid scheme. In the hybrid scheme, the DCI can be transmitted by using both SFN scheme and non-SFH scheme.

At block 230, the UE determines whether a TCI for the PDSCH reception is present in the received DCI or not, i.e. the UE 110 determines whether the "tci-PresentInDCI" is enabled. If the UE 110 determines that the TCI is not present in DCI ("tci-PresentInDCI" is not enabled) and based on the determined DCI transmission scheme of the received DCI, at block 240, the UE 110 may select at least one TCI for PDSCH reception from candidate TCIs configured for one or more CORESET associated with the scheduling PDCCH.

As described above, different number of CORESET(s) can be configured for PDCCH scheduling in the SFN scheme or in the non-SFN scheme. Furthermore, different number of TCIs may be required for the single-TRP scenario and multiple-TRP scenario. Now the selection of TCI can be further described with FIGS. 3-9.

Figure 3:
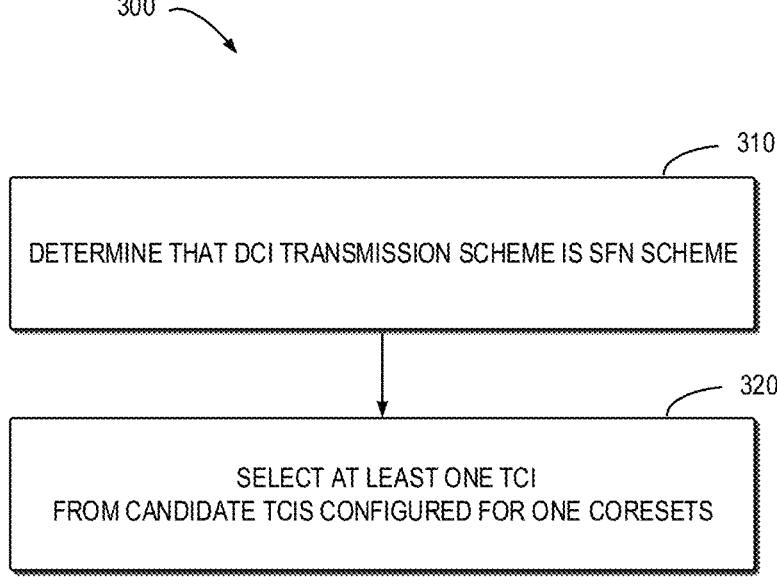
FIG. 3 illustrates a flowchart illustrating an example method of downlink data reception operation in the SFN scheme according to some embodiments of the present disclosure.

Reference is now made to FIG. 3. FIG. 3 illustrates a flowchart illustrating an example method 300 of downlink data reception operation in the SFN scheme according to some embodiments of the present disclosure. For the purpose of discussion, the method 300 will be described with reference to FIG. 1. The method 300 may involve the UE 110 shown in FIG. 1.

At block 310, the UE 110 may determine that the DCI transmission scheme is the SFN scheme. At block 320, the UE 110 may select the at least one TCI from candidate TCIs configured for a single CORESET for the PDCCH scheduling.

In a case where the PDSCH is transmitted from a single TRP, a single TCI is required for the PDSCH reception. In this case, the UE 110 may select one TCI from two candidate TCIs, which may be referred to as the two TCI states configured for the CORESET.

For example, the UE 110 may select a TCI with a predefined ordinal number from the two candidate TCIs. That is, the UE 110 may select the first TCI configured for the CORESET with scheduling PDCCH or select the second TCI configured for the CORESET with scheduling PDCCH.

The UE 110 may determine whether the first or the TCI configured for the CORESET with scheduling PDCCH is to be used based on an indication obtained from the received DCI.

As another option, the UE 110 may select a TCI with a predefined identification (ID) from the two candidate TCIs. That is, the UE 110 may select a TCI with a highest ID configured for the CORESET with scheduling PDCCH or select a TCI with a lowest ID configured for the CORESET with scheduling PDCCH.

For the scenario where the SFN scheme can be supported and the PDSCH is transmitted from a single TRP, a scheduling restriction can be introduced that the BS is not allowed to configure more than one CORESET pools and configure the SFN scheme for PDCCH/PDSCH at the same time.

In a case where the PDSCH transmission can be supported in single-DCI based multi-TRP s operation, the UE 110 may require more than one TCI for the PDSCH reception. Therefore, the UE 110 may select all candidate TCIs configured for the CORESET with scheduling PDCCH for the PDSCH reception.

The UE 110 may further determine whether SDM/FDM/TDM/HST operation is to be applied based on the configuration received via an upper layer signaling. Hereinafter the term "upper layer signaling" may be referred to higher layer signaling such as a Radio Resource Control (RRC) signal or Medium Access Control-Control Element (MAC CE).

Furthermore, the mapping between the select TCIs and the PDSCH reception can be predefined or configured by an upper layer signaling. Alternatively, the mapping can also be obtained from the scheduling PDCCH. It is also possible that the mapping can be determined by the TCI order indicated by MAC CE for the CORESET. For example, the order could be different if the BS transmits a MAC CE to activate TCI {1, 2} for a CORESET compared to the MAC CE to activate TCI {2, 1} for a CORESET.

In some embodiments, the UE 110 can determine whether the PDSCH reception is for a single TRP scenario or a multi-TRP scenario is to be applied based on an upper layer signaling. It is also possible that the UE 110 determines whether the PDSCH reception is for a single TRP scenario or a multi-TRP scenario is to be applied based on the scheduling DCI or the capability of the UE 110.

Figure 4A:
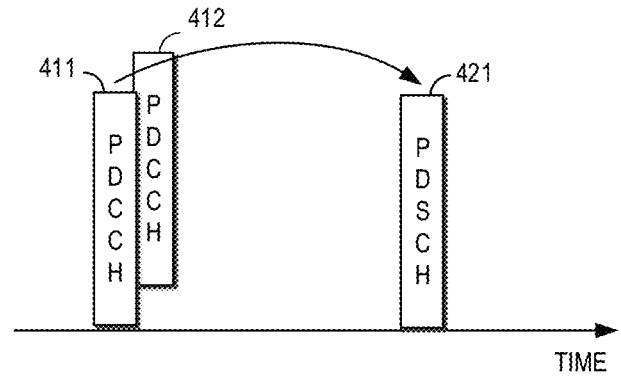
FIG. 4A illustrates a schematic diagram of TCI selection for date receptions in the SFN scheme according to some embodiments of the present disclosure.
Figure 4B:
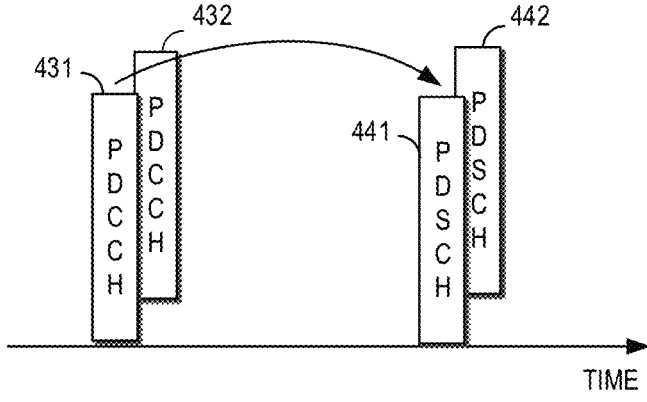
FIG. 4B illustrates a schematic diagram of TCI selection for date receptions in the SFN scheme according to some embodiments of the present disclosure.

Now the reference is made to FIGS. 4A and 4B. FIGS. 4A and 4B illustrate schematic diagrams of TCI selection for date receptions in the SFN scheme for the single TRP scenario and for the multi-TRP scenario, respectively.

For the single TRP scenario, as shown in FIG. 4A, the UE 110 may determine the beam associated with the PDSCH transmission based on one of TCIs configured the CORESET with scheduling PDCCH 411 and 412 on overlapped resources. Then the UE 110 may perform data reception on the PDSCH 421 based on the selected TCI.

For the multi-TRP scenario, as shown in FIG. 4B, the UE 110 may determine the beam associated with the PDSCH transmission based on candidate TCIs configured the CORESET with scheduling PDCCH 431 and 432 on overlapped resources. Then the UE 110 may perform data reception on the PDSCH 441 and PDSCH 442 based on the selected TCIs.

Figure 5:
FIG. 5 illustrates a flowchart illustrating an example method of downlink data reception operation in the non-SFN scheme according to some embodiments of the present disclosure.
Figure 5:
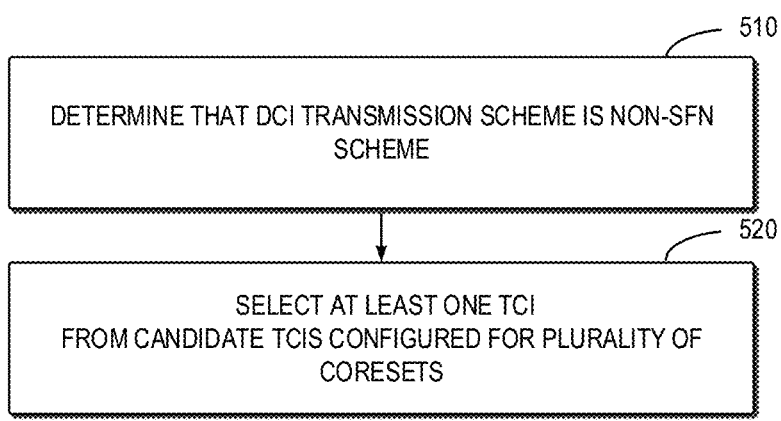

Reference is now made to FIG. 5. FIG. 5 illustrates a flowchart illustrating an example method 500 of downlink data reception operation in the non-SFN scheme according to some embodiments of the present disclosure. For the purpose of discussion, the method 500 will be described with reference to FIG. 1. The method 500 may involve the UE 110 shown in FIG. 1.

At block 510, the UE 110 may determine that the DCI transmission scheme is the non-SFN scheme. At block 520, the UE 110 may select the at least one TCI from candidate TCIs configured for a plurality of CORESET for the PDCCH scheduling. In the non-SFN scheme, the PDCCH repetitions can be carried by 2 Search Spaces (SSs), which can be connected to 2 CORESETs and each CORESET for the PDCCH scheduling can be configured with one TCI state.

In a case where the PDSCH is transmitted from a single TRP, a single TCI is required for the PDSCH reception. In this case, the UE 110 may select a TCI of one of the two CORESETs. For example, the UE 110 may select a TCI of a CORESET with a predefined ID of the two CORESETs. That is, the UE 110 may select a CORESET with a highest ID with scheduling PDCCH repetitions or select a CORESET with a lowest ID with scheduling PDCCH repetitions.

Alternatively, the UE 110 may select a TCI of a CORESET associated with a SS with a predefined ID with scheduling PDCCH repetitions. For example, the UE 110 may select a CORESET associated with a SS with a highest ID with scheduling PDCCH repetitions or select a CORESET associated with a SS with a lowest ID with scheduling PDCCH repetitions.

As another option, the UE 110 may select a TCI with a predefined ID from candidate TCIs configured for the linked SS or CORESET with scheduling PDCCH repetitions. For example, the UE 110 may select a TCI with a highest ID from candidate TCIs or select a TCI with a lowest ID from candidate TCIs.

It is also possible that the UE 110 may determine one of the candidate TCIs which is configured for the PDCCH repetitions for a predetermined time. For example, the UE 110 may select a TCI configured for the first PDCCH repetitions or select a TCI configured for the second PDCCH repetitions.

For the scenario where the non-SFN scheme can be supported and the PDSCH is transmitted from a single TRP, a scheduling restriction can be introduced that the BS is not allowed to configure more than one CORESET pools for the linked CORESETs for PDCCH repetitions.

Alternatively, the linked CORESETs may also be configured with different CORESET pool index, which may be associated with the TRP index. The UE 110 may determine the scramble ID for PDSCH, rate matching pattern and HARQ-ACK based on one of the CORESET pool index. The CORESET pool index can be determined by the ID of SSs/CORESETs, e.g. the SS/CORESET with lowest ID. Alternatively, the CORESET pool index can also be predefined, e.g. CORESET pool 0 is assumed.

In a case where the PDSCH transmission can be supported in single-DCI based multi-TRPs operation, the UE 110 may require more than one TCI for the PDSCH reception. Therefore, the UE 110 may select all candidate TCIs configured for the two linked CORESET with scheduling PDCCH repetitions.

The UE 110 may further determine whether SDM/FDM/TDM/HST operation is to be applied based on the configuration received via an upper layer signaling.

Furthermore, the mapping between the select TCIs and the PDSCH reception can be predefined or configured by an upper layer signaling. Alternatively, the mapping can also be obtained from the scheduling PDCCH. It is also possible that the mapping can be determined by time or frequency resources for the PDCCH repetitions.

In some embodiments, the UE 110 can determine whether the PDSCH reception is for a single TRP scenario or a multi-TRP scenario is to be applied based on an upper layer signaling. It is also possible that the UE 110 determines whether the PDSCH reception is for a single TRP scenario or a multi-TRP scenario is to be applied based on the scheduling DCI or the capability of the UE 110.

Figure 6A:
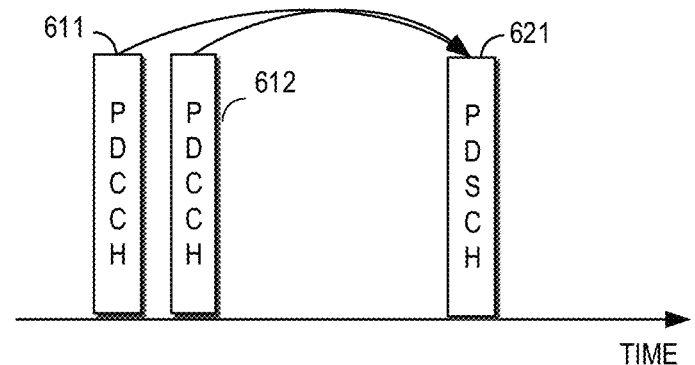
FIG. 6A illustrates a schematic diagram of TCI selection for date receptions in the non-SFN scheme according to some embodiments of the present disclosure.
Figure 6B:
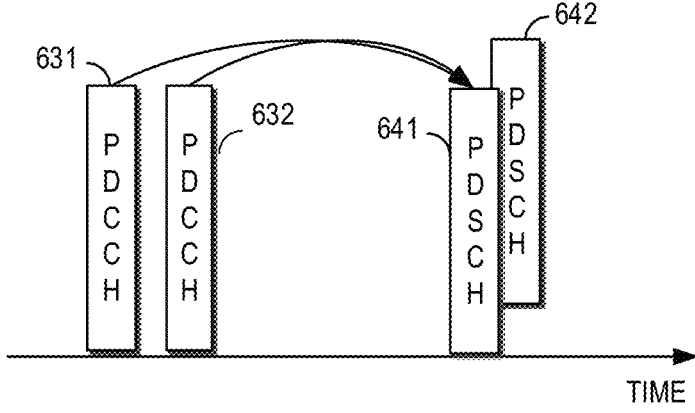
FIG. 6B illustrates a schematic diagram of TCI selection for date receptions in the non-SFN scheme according to some embodiments of the present disclosure.

Now the reference is made to FIGS. 6A and 6B. FIGS. 6A and 6B illustrate schematic diagrams of TCI selection for date receptions in the non-SFN scheme for the single TRP scenario and for the multi-TRP scenario, respectively.

For the single TRP scenario, as shown in FIG. 6A, the UE 110 may determine the beam associated with the PDSCH transmission based on one of TCIs configured the CORESETs with scheduling PDCCH 611 and 612 on non-overlapped resources. Then the UE 110 may perform data reception on the PDSCH 621 based on the selected TCI.

For the multi-TRP scenario, as shown in FIG. 6B, the UE 110 may determine the beam associated with the PDSCH transmission based on candidate TCIs configured the CORESETs with scheduling PDCCH 631 and 632 on non-overlapped resources. Then the UE 110 may perform data reception on the PDSCH 641 and PDSCH 642 based on the selected TCIs.

Figure 7:
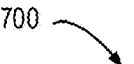
FIG. 7 illustrates a flowchart illustrating an example method of downlink data reception operation in hybrid of SFN scheme and non-SFN scheme according to some embodiments of the present disclosure.
Figure 7:
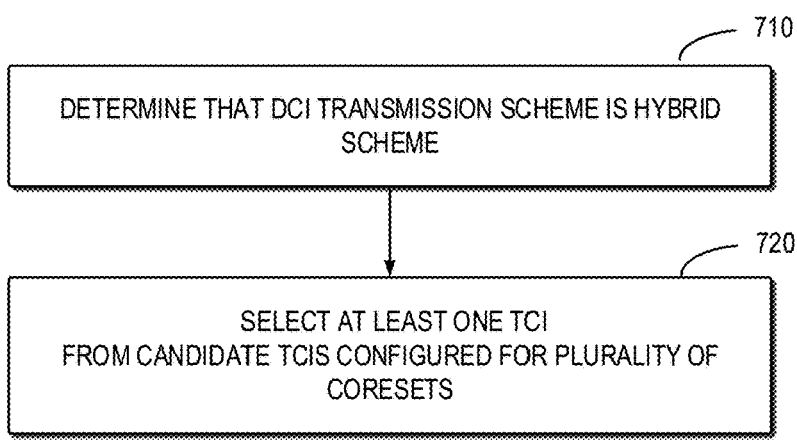

Reference is now made to FIG. 7. FIG. 7 illustrates a flowchart illustrating an example method 700 of downlink data reception operation in hybrid of SFN scheme and non-SFN scheme according to some embodiments of the present disclosure. For the purpose of discussion, the method 700 will be described with reference to FIG. 1. The method 700 may involve the UE 110 shown in FIG. 1.

At block 710, the UE 110 may determine that the DCI transmission scheme is the hybrid scheme. At block 720, the UE 110 may select the at least one TCI from candidate TCIs configured for a plurality of CORESETs for the PDCCH scheduling and each of the plurality of CORESET may be configure with one or more TCI states.

In a case where the PDSCH is transmitted from a single TRP, a single TCI is required for the PDSCH reception. In this case, the UE may select one CORSET from the plurality of CORESETs for the PDCCH scheduling. The CORESET selection in the hybrid of SFN scheme and non-SFN scheme may be similar with the CORESET selection in the non-SFN scheme.

In some embodiments, the UE 110 may select one of the plurality of CORESETs which has a predefined ID. For example, the UE 110 may select a CORESET with a highest ID with scheduling PDCCH repetitions or select a CORESET with a lowest ID with scheduling PDCCH repetitions.

In some embodiments, the UE 110 may select one of the plurality of CORESETs which is associated with a SS with a predefined ID with scheduling PDCCH repetitions. For example, the UE 110 may select a CORESET associated with a SS with a highest ID with scheduling PDCCH repetitions or select a CORESET associated with a SS with a lowest ID with scheduling PDCCH repetitions.

If the selected CORESET is configured with a single TCI, this TCI can be selected for the PDSCH reception of the UE 110. If the selected CORESET is configured with more than one TCIs, the UE 110 may further select one TCI for the PDSCH reception from candidate TCIs configured for the selected CORESET. The selection of TCI from candidate TCIs can be similar with the mechanism for the TCI selection in the SFN scheme scenario.

In some embodiments, if the selected CORESET is configured with multiple candidate TCIs, the UE 110 may select one of the multiple candidate TCIs with a predefined order numbers. For example, the UE 110 may select the first TCI configured for the CORESET with scheduling PDCCH or select the second TCI configured for the CORESET with scheduling PDCCH.

In some embodiments, the UE 110 may also select one of the multiple candidate TCIs with a predefined ID. For example, the UE 110 may select a TCI with a highest ID configured for the CORESET with scheduling PDCCH or select a TCI with a lowest ID configured for the CORESET with scheduling PDCCH.

Furthermore, for the hybrid scenario, the UE 110 may also select one of candidate TCIs configured for the link CORESETs or SSs with scheduling PDCCH repetition. The selected TCI may have a predefined ID. For example, there are two linked CORESET and each of them is configured with two TCIs. The UE 110 may select one of candidate TCIs (four TCIs in total) which has a highest ID or a lowest ID.

As another option, the UE 110 may also select one of candidate TCIs configured for the PDCCH repetitions for a predetermined time. For example, the UE 110 may select a TCI configured for the first PDCCH repetitions or select a TCI configured for the second PDCCH repetitions.

In some embodiments, the UE 110 may also select the TCI from one of the plurality of CORESET configured with a single TCI. If there are multiple CORESETs from the plurality of CORESETs configured with a single TCI, the CORESET selection may be performed based on the CORESET ID, as described above.

For the scenario where the hybrid of SFN scheme and non-SFN scheme can be supported and the PDSCH is transmitted from a single TRP, a scheduling restriction can be introduced that the BS is not allowed to configure more than one CORESET pools and configure for the linked CORESETs for PDCCH repetitions.

Alternatively, the linked CORESETs may also be configured with different CORESET pool index, which is associated with the TRP index. The UE 110 may determine the scramble ID for PDSCH, rate matching pattern and HARQ-ACK based on one of the CORESET pool index. The CORESET pool index can be determined by the ID of SSs/CORESETs. Alternatively, the CORESET pool index can also be predefined.

In a case where the PDSCH transmission can be supported in single-DCI based multi-TRPs operation, the UE 110 may require more than one TCI for the PDSCH reception.

In some embodiments, the UE 110 may select TCIs for the PDSCH reception configured for one of the plurality of CORESETs which is configured with two TCI states. If multiple CORESETs in the plurality of CORESETs are configured with two TCI states, the UE 110 may further select one of the multiple CORESETs. For example, the CORESET can be selected based on the CORESET ID or the SS ID which is associated with the CORESET.

Alternatively, the UE 110 may select TCIs for the PDSCH reception from candidate TCIs configured for the plurality of CORESETs. The selected TCIs may have lowest ID among all candidate TCIs. For example, there are two linked CORESET and each of them is configured with two TCIs. The UE 110 may select TCIs for the PDSCH reception from candidate TCIs (four TCIs in total) which have lowest IDs among the candidate TCIs.

The UE 110 may further determine whether SDM/FDM/TDM/HST operation is to be applied based on the configuration received via an upper layer signaling.

Furthermore, the mapping between the select TCIs and the PDSCH reception can be predefined or configured by an upper layer signaling. Alternatively, the mapping can also be obtained from the scheduling PDCCH. It is also possible that the mapping can be determined by time or frequency resources for the PDCCH repetitions.

In some embodiments, the UE 110 can determine whether the PDSCH reception is for a single TRP scenario or a multi-TRP scenario is to be applied based on an upper layer signaling. It is also possible that the UE 110 determines whether the PDSCH reception is for a single TRP scenario or a multi-TRP scenario is to be applied based on the scheduling DCI or the capability of the UE 110.

Moreover, the BS may determine a scheduling restriction that the scenario of the hybrid of the SFN scheme and the non-SFN scheme for PDCCH repetitions is not allowed.

Figure 8A:
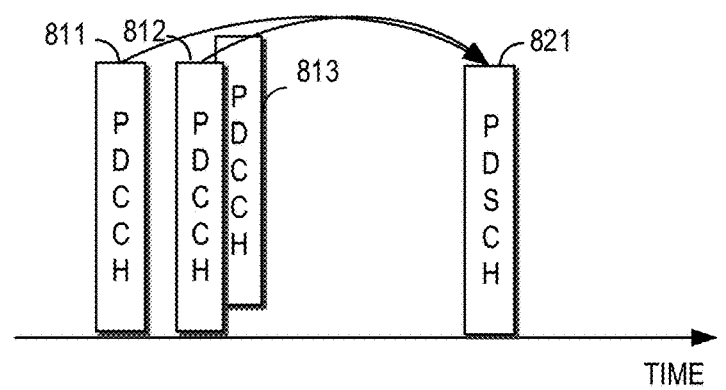
FIG. 8A illustrates a schematic diagram of TCI selection for date receptions in the hybrid of SFN scheme and non-SFN scheme according to some embodiments of the present disclosure.
Figure 8B:
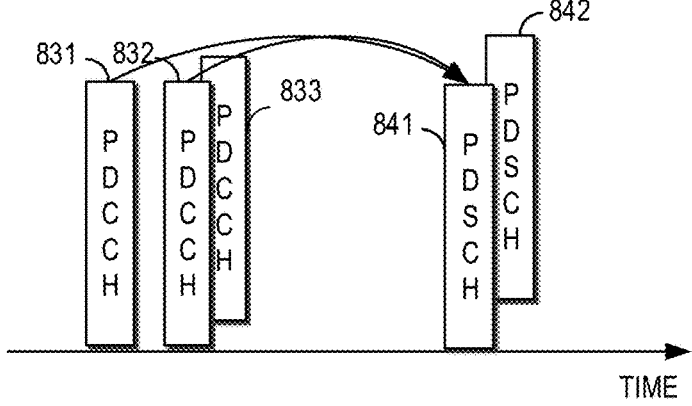
FIG. 8B illustrates a schematic diagram of TCI selection for date receptions in hybrid of SFN scheme and non-SFN scheme according to some embodiments of the present disclosure.

Now the reference is made to FIGS. 8A and 8B. FIGS. 8A and 8B illustrate schematic diagrams of TCI selection for date receptions in the hybrid of the SFN scheme and the non-SFN scheme for the single TRP scenario and for the multi-TRP scenario, respectively.

For the single TRP scenario, as shown in FIG. 8A, the UE 110 may determine the beam associated with the PDSCH transmission based on one of TCIs configured the CORESETs with scheduling PDCCH 812 and 813 on overlapped resources and PDCCH 811 on non-overlapped resources. Then the UE 110 may perform data reception on the PDSCH 821 based on the selected TCI.

For the multi-TRP scenario, as shown in FIG. 8B, the UE 110 may determine the beam associated with the PDSCH transmission based on candidate TCIs configured the CORESETs with scheduling PDCCH 832 and 833 on overlapped resources and PDCCH 831 on non-overlapped resources. Then the UE 110 may perform data reception on the PDSCH 841 and PDSCH 842 based on the selected TCIs.

Figure 9:
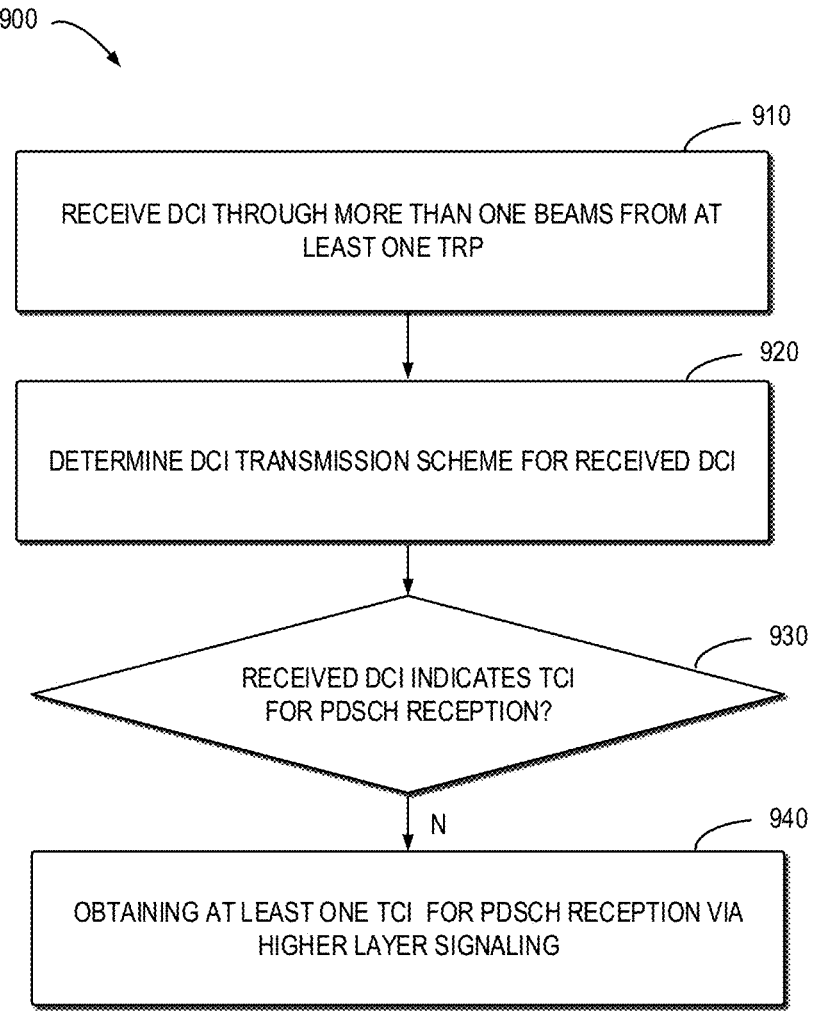
FIG. 9 illustrates a flowchart illustrating an example method of downlink data reception operation according to some embodiments of the present disclosure.

Reference is now made to FIG. 9. FIG. 9 illustrates a flowchart of an example method 900 for downlink data reception operation according to some embodiments of the present disclosure. For the purpose of discussion, the method 900 will be described with reference to FIG. 1. The method 900 may involve the UE 110 shown in FIG. 1.

At block 910, the UE 110 receives DCI through more than one beams from at least one TRP 120. The DCI can be carried on PDCCH(s) from the at least one TRP 120 to the UE 110. The UE 110 may determine the PDCCH on time and frequency domain based on the CORESET and/or SS.

At block 920, the UE 110 determines a DCI transmission scheme for the received DCI. As described above, the PDCCH repetitions can be transmitted by BS with fully overlapped resources with different beams in SFN scheme, while the PDCCH repetitions can be transmitted by BS with non-overlapped resources with different beams in non-SFN scheme. Furthermore, the received DCI can be transmitted from the at least one TRP 120 in a hybrid scheme. In the hybrid scheme, the DCI can be transmitted by using both SFN scheme and non-SFH scheme.

At block 930, the UE determines whether a TCI for the PDSCH reception is present in the received DCI or not, i.e. the UE 110 determines whether the "tci-PresentInDCI" is enabled. If the UE 110 determines that the TCI is not present in DCI ("tci-PresentInDCI" is not enabled) and based on the determined DCI transmission scheme of the received DCI, at block 940, the UE 110 may obtain a TCI for PDSCH reception via an upper layer signaling. That is, the TCI can be pre-configured.

In this way, the mechanism for PDSCH reception when the TCI is not present in the scheduling DCI can be achieved by applying the TCI state configured for CORESET(s) with scheduling PDCCH.

Figure 10:
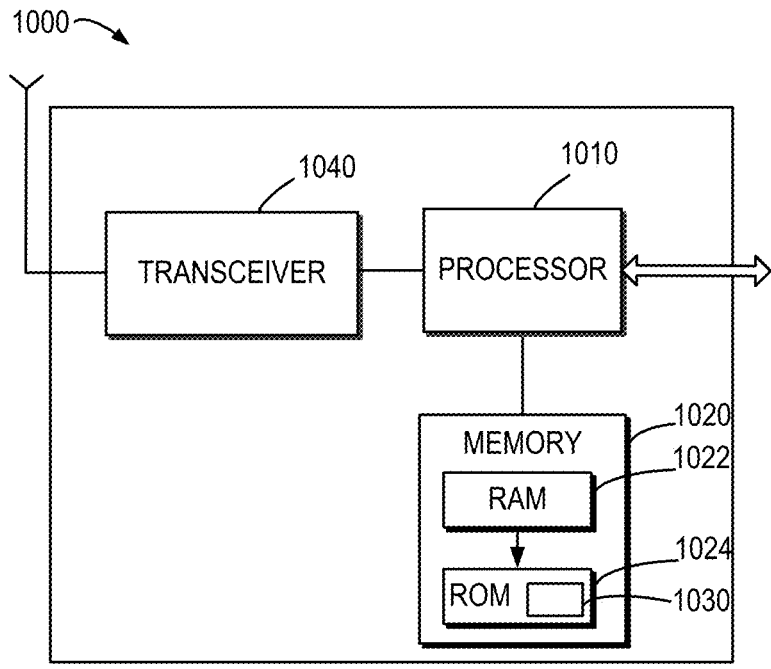
FIG. 10 illustrates a simplified block diagram of a device that is suitable for implementing embodiments of the present disclosure.

FIG. 10 is a simplified block diagram of a device 1000 that is suitable for implementing embodiments of the present disclosure. For example, the BS 120 and the UE 110 can be implemented by the device 1000. As shown, the device 1000 includes a processor 1010, a memory 1020 coupled to the processor 1010, and a transceiver 1040 coupled to the processor 1010.

The transceiver 1040 is for bidirectional communications. The transceiver 1040 is coupled to at least one antenna to facilitate communication. The transceiver 1040 can comprise a transmitter circuitry (e.g., associated with one or more transmit chains) and/or a receiver circuitry (e.g., associated with one or more receive chains). The transmitter circuitry and receiver circuitry can employ common circuit elements, distinct circuit elements, or a combination thereof.

The processor 1010 may be of any type suitable to the local technical network and may include one or more of the following: general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

The memory 1020 may include one or more non-volatile memories and one or more volatile memories. Examples of the non-volatile memories include, but are not limited to, a Read Only Memory (ROM) 1024, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1022 and other volatile memories that will not last in the power-down duration.

A computer program 1030 includes computer executable instructions that are executed by the associated processor 1010. The program 1030 may be stored in the ROM 1024. The processor 1010 may perform any suitable actions and processing by loading the program 1030 into the RAM 1022.

The embodiments of the present disclosure may be implemented by means of the program 1030 so that the device 1000 may perform any method of the disclosure as discussed with reference to FIGS. 2, 3, 5, 7 and 9. The embodiments of the present disclosure may also be implemented by hardware or by a combination of software and hardware.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 as described above with reference to FIG. 2 and/or the method 300 as described above with reference to FIG. 3 and/or the method 500 as described above with reference to FIG. 5 and/or the method 700 as described above with reference to FIG. 7 and/or the method 900 as described above with reference to FIG. 9.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A baseband processor of a user equipment (UE) configured to perform operations comprising:

receiving Downlink Control Information (DCI) through more than one beam from more than one Transceiver Point (TRP);

determining a physical downlink control channel (PDCCH) specific transmission scheme for the received DCI, wherein the PDCCH specific transmission scheme is configured by an upper layer signaling, and wherein the PDCCH specific transmission scheme is one of a Single Frequency Network (SFN) scheme, a non-SFN scheme, and a hybrid scheme, wherein the DCI is transmitted using both SFN scheme and non-SFH scheme in the hybrid scheme;

determining whether the received DCI indicates a Transmission Configuration Indicator (TCI) for PDSCH reception from the more than one TRP or not; and in accordance with a determination that the received DCI fails to indicate the TCI and that a scheduling offset is equal to or greater than a threshold and based on the determined PDCCH specific transmission scheme, determining that the PDSCH is to be transmitted by a single TRP of the more than one TRP, and selecting at least one TCI for the PDSCH reception from candidate TCIs configured for one or more Control Resource Sets (CORESETs) associated with the DCI, wherein selecting the at least one TCI is based on the one or more CORESETs with a lowest CORESET ID.

2. The baseband processor of claim 1, wherein selecting the at least one TCI comprises:

in accordance with a determination that the PDCCH specific transmission scheme is the SFN scheme, selecting the at least one TCI from candidate TCIs configured for a single CORESET associated with the DCI.

3. The baseband processor of claim 2, wherein selecting the at least one TCI from candidate TCIs configured for one CORESET comprising:

in accordance with a determination that a single TCI is required for the PDSCH reception, selecting, from the candidate TCIs, a TCI with a predefined ordinal number or a predefined identification.

4. The baseband processor of claim 2, wherein the operations further comprise:

in accordance with a determination that a single TCI is required for the PDSCH reception, obtaining, from the DCI, an indication of an index of a candidate TCI to be used for the PDSCH reception; and selecting a TCI from the candidate TCIs based on the index.

5. The baseband processor of claim 2, wherein selecting the at least one TCI from candidate TCIs configured for one CORESET comprising:

in accordance with a determination that a plurality of TCIs are required for the PDSCH reception, selecting the candidate TCIs as the plurality of TCIs.

6. The baseband processor of claim 1, wherein selecting the at least one TCI comprises:

in accordance with a determination that the PDCCH specific transmission scheme is the non-SFN scheme, selecting the at least one TCI from candidate TCIs configured for a plurality of CORESETs associated with the DCI, a CORESET of the plurality of CORESETs configured with a single candidate TCI.

7. The baseband processor of claim 6, wherein selecting the at least one TCI from the candidate TCIs configured for the plurality of CORESETs comprises:

in accordance with a determination that a single TCI is required for the PDSCH reception, selecting one of the plurality of CORESET which has a predefined identification; and selecting a candidate TCI configured for the selected CORESET.

8. The baseband processor of claim 6, wherein selecting the at least one TCI from the candidate TCIs configured for the plurality of CORESETs comprises:

in accordance with a determination that a single TCI is required for the PDSCH reception, selecting one of the plurality of CORESET which is associated with a Search Space (SS) for the DCI reception with a predefined identification; and selecting a candidate TCI configured for the selected CORESET.

9. The baseband processor of claim 6, wherein selecting the at least one TCI from the candidate TCIs configured for the plurality of CORESETs comprises:

in accordance with a determination that a single TCI is required for the PDSCH reception, selecting one of the candidate TCIs which has a predefined identification.

10. The baseband processor of claim 6, wherein selecting the at least one TCI from the candidate TCIs configured for the plurality of CORESETs comprises:

in accordance with a determination that a single TCI is required for the PDSCH reception, selecting one of the candidate TCIs which is configured for the DCI reception for a predetermined time.

11. The baseband processor of claim 6, wherein selecting the at least one TCI from the candidate TCIs configured for the plurality of CORESETs comprises:

in accordance with a determination that a plurality of TCIs are required for the PDSCH reception, selecting the candidate TCIs as the plurality of TCIs.

12. The baseband processor of claim 1, wherein selecting the at least one TCI comprises:

in accordance with a determination that the PDCCH specific transmission scheme is the hybrid scheme, selecting the at least one TCI from candidate TCIs, the candidate TCIs configured for a plurality of CORE-SETs associated with the DCI, one of the plurality of CORESETs configured with one or more TCIs.

13. The baseband processor of claim 12, wherein selecting the at least one TCI from the candidate TCIs configured for the plurality of CORESETs comprises:

in accordance with a determination that a single TCI is required for the PDSCH reception, selecting one of the plurality of CORESET which has a predefined identification; and in accordance with a determination that the selected CORESET is configured with one candidate TCI, selecting the candidate TCI as the single TCI.

14. The baseband processor of claim 12, wherein selecting the at least one TCI from the candidate TCIs configured for the plurality of CORESETs comprises:

in accordance with a determination that a single TCI is required for the PDSCH reception, selecting one of the candidate TCIs which has a predefined identification.

15. The baseband processor of claim 12, wherein selecting the at least one TCI from the candidate TCIs configured for the plurality of CORESETs comprises:

in accordance with a determination that a single TCI is required for the PDSCH reception, selecting one of the candidate TCIs which is configured for the DCI reception for a predetermined time.

16. The baseband processor of claim 12, wherein selecting the at least one TCI from the candidate TCIs configured for the plurality of CORESETs comprises:

in accordance with a determination that a single TCI is required for the PDSCH reception, selecting one of the plurality of CORESET configured with a single candidate TCI; and selecting the candidate TCI of the selected CORESET.

17. The baseband processor of claim 12, wherein selecting the at least one TCI from the candidate TCIs configured for the plurality of CORESETs comprises:

in accordance with a determination that a single TCI is required for the PDSCH reception, selecting one of the plurality of CORESET which is associated with a Search Space (SS) for the DCI reception with a predefined identification; and in accordance with a determination that the selected CORESET is configured with one candidate TCI, determining the candidate TCI as the single TCI.

18. The baseband processor of claim 17, wherein the operations further comprise:

in accordance with a determination that the selected CORESET is configured with more than one candidate TCIs, selecting, from the candidate TCIs configured for the selected CORESET, a TCI with a predefined ordinal number or a predefined identification.

19. A method, comprising:

receiving Downlink Control Information (DCI) through more than one beam from more than one Transceiver Point (TRP);

determining a physical downlink control channel (PDCCH) specific transmission scheme for the received DCI, wherein the PDCCH specific transmission scheme is configured by an upper layer signaling, and wherein the PDCCH specific transmission scheme is one of a Single Frequency Network (SFN) scheme, a non-SFN scheme, and a hybrid scheme, wherein the DCI is transmitted using both SFN scheme and non-SFH scheme in the hybrid scheme;

determining whether the received DCI indicates a Transmission Configuration Indicator (TCI) for PDSCH reception from the more than one TRP or not; and in accordance with a determination that the received DCI fails to indicate the TCI and that a scheduling offset is equal to or greater than a threshold and based on the determined PDCCH specific transmission scheme, determining that the PDSCH is to be transmitted by a single TRP of the more than one TRP, and selecting at least one TCI for the PDSCH reception from candidate TCIs configured for one or more Control Resource Sets (CORESETs) associated with the DCI, wherein selecting the at least one TCI is based on the one or more CORESETs with a lowest CORESET ID.

20. A user equipment (UE), comprising:

a transceiver configured to communicate with a network; and a processor communicatively coupled to the transceiver and configured to:

process, based on signaling received via more than one beam from more than one Transceiver Point (TRP), Downlink Control Information (DCI);

determine a physical downlink control channel (PDCCH) transmission scheme for the received DCI, wherein the PDCCH specific transmission scheme is configured by an upper layer signaling, and wherein the PDCCH specific transmission scheme is one of a Single Frequency Network (SFN) scheme, a non-SFN scheme, and a hybrid scheme, wherein the DCI is transmitted using both SFN scheme and non-SFH scheme in the hybrid scheme;

determine whether the received DCI indicates a Transmission Configuration Indicator (TCI) for PDSCH reception from the more than one TRP or not; and in accordance with a determination that the received DCI fails to indicate the TCI and that a scheduling offset is equal to or greater than a threshold and based on the determined PDCCH specific transmission scheme, determine that the PDSCH is to be transmitted by a single TRP of the more than one TRP, and select at least one TCI for the PDSCH reception from candidate TCIs configured for one or more Control Resource Sets (CORESETs) associated with the DCI, wherein selecting the at least one TCI is based on the one or more CORESETs with a lowest CORESET ID.

* * * * *